Nov. 21, 1967  A. I. MEDEN ET AL  3,353,523

FOUR-STROKE TWIN COMBUSTION ENGINE

Original Filed Sept. 21, 1964

United States Patent Office 3,353,523
Patented Nov. 21, 1967

3,353,523
FOUR-STROKE TWIN COMBUSTION ENGINE
Alexandr Ivanovich Meden and Viktor Petrovich Surov, Kolomna, U.S.S.R., assignors to Kolomensky Teplovozostroitelny Zavod imeni V.V., Kuibysheva, U.S.S.R.
Continuation of application Ser. No. 398,012, Sept. 21, 1964. This application Dec. 30, 1966, Ser. No. 606,466
3 Claims. (Cl. 123—55)

ABSTRACT OF THE DISCLOSURE

A four-stroke twin combustion engine having two rows of cylinders, a camshaft located between the rows of cylinders and common cams for respectively driving the inlet and exhaust valves in cylinders in opposite rows via levers located in a plane perpendicular to the axis of the camshaft and interacting with said valves.

---

This application is a continuation of our earlier application S.N. 398,012 filed Sept. 21, 1964, and now abandoned.

The present invention relates to combustion engines, in particular to four stroke twin in-line engines and a variation of these, which is a V compression ignition engine.

It is known that underneath or overhead camshafts are used to drive valves of four-stroke or V combustion engines.

The use of an overhead camshaft operating on both lines of cylinders simplifies the whole design of the engine. The shortcoming of this design is the necessity to use right-hand and left-hand valve gears or different cams for driving the valves of opposite cylinders, as well as different cylinder heads in some cases. This involves the application of different devices in the same engine, said devices serving the same purpose.

An object of the invention is to provide a four-stroke twin in-line or V combustion engine with unified levers for driving intake and exhaust valves and identical cylinder heads for right and left cylinder banks.

According to the invention, this is effected by placing levers of the valves in the plane that passes through the axis of the cylinder and is perpendicular to the axis of the camshaft.

Figure 1:
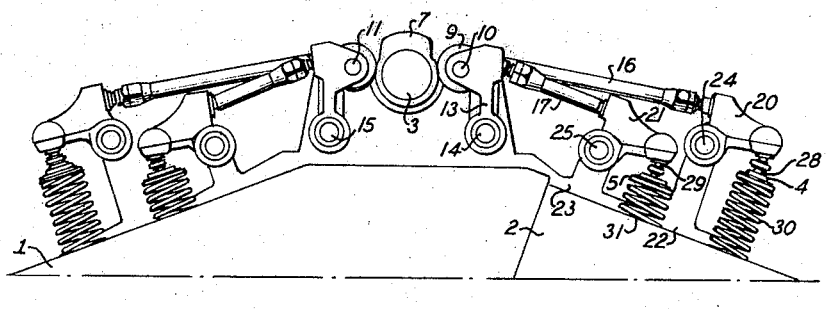
Figure 2:
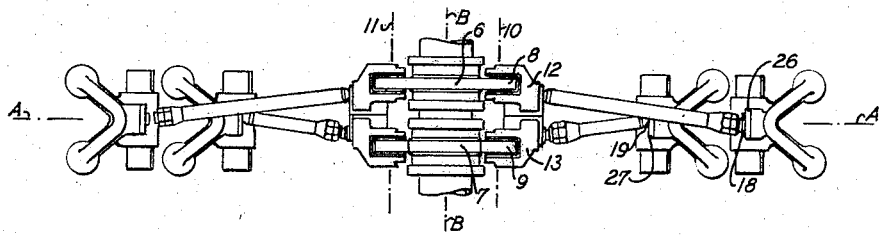

Other objects and advantages of the invention will become apparent from the following description and accompanying drawings, wherein:

FIG. 1 shows a side view of a valve drive device,
FIG. 2 shows a plane view of a valve drive device.

The present four-stroke twin in-line or V combustion engine comprises two banks of cylinders, viz., left bank 1 and right bank 2. Camshaft 3 which operates on both banks of cylinders and carries cams for driving inlet valves 4 and exhaust valves 5 is located between the cylinder banks in the upper part of the engine. Every inlet cam 6 and exhaust cam 7 drives inlet valve 4 and exhaust valve 5 on the opposite cylinders of left bank 1 and right bank 2.

Rollers 8 and 9 cooperate with cams 6 and 7 and are installed on levers 12 and 13 of the tappets by means of shafts 10 and 11.

The tappets pivot on shafts 14 and 15. Levers 12 and 13 are connected with rods 16 and 17, the latter being respectively joined to levers 20 and 21 of inlet valve 4 and exhaust valve 5 by means of articulated joints 18 and 19.

Levers 20 and 21 are mounted on brackets 22 and 23 and pivot on shafts 24 and 25. Arms 26 and 27 of levers 20 and 21 receive thrust from rods 16 and 17.

The other arms of levers 20 and 21 press on tappets 28 and 29 of the valves and, open valves 4 and 5 against the action of springs 30 and 31.

Levers 20 and 21 are located in the plane passing through the axis A—A of the cylinders and perpendicular to the axis B—B of the crankshaft.

The present invention is described with reference to the preferred embodiment but alterations and modifications are possible without departing from the spirit and scope of the invention, as those skilled in the art will easily understand.

Such alterations and modifications should be regarded as falling within the spirit and scope of the invention as defined by the appended claims.

We claim:
1. A four-stroke twin combustion engine comprising: two rows of cylinders with heads; a camshaft located between said rows of cylinders, intake and exhaust valves located in said cylinder heads; levers interacting with said valves; inclined rods having hinged connection with said levers, said levers being arranged in a plane perpendicular to the axis of the camshaft; tappets hinge-connected to said rods; a first set of cams mounted on the camshaft each operating the intake valves of respective opposed cylinders via corresponding tappets, inclined rods and levers; and a second set of cams mounted on the camshaft each operating the exhaust valves of respective opposed cylinders via corresponding tappets, inclined rods and levers.

2. An engine as claimed in claim 1 wherein the tappets for the inlet valves of each pair of opposed cylinders are hingeably supported on opposite sides of the associated cam of said first set and the tappets for the exhaust valves of each pair of opposed cylinders are hingeably supported on opposite sides of the associated cam of said second set.

3. An engine as claimed in claim 2 wherein said tappets for the inlet valves and the tappets for the exhaust valves of each opposed pair of cylinders are in axially spaced relation along the camshaft and are located equal distances from the line passing through the axes of an opposed pair of cylinders.

References Cited

UNITED STATES PATENTS

| | | |
|---|---|---|
| 1,048,610 | 12/1912 | Wallace. |
| 1,427,190 | 8/1922 | Brown _____ 123—55 |
| 1,488,285 | 3/1924 | Rhoads _____ 123—55 |

FOREIGN PATENTS

| | | |
|---|---|---|
| 434,409 | 4/1948 | Italy. |
| 352,185 | 3/1961 | Switzerland. |

OTHER REFERENCES

Motor Italia, December 1926, p. 6.

WENDELL E. BURNS, *Primary Examiner.*
CARLTON R. CROYLE, *Examiner.*